United States Patent [19]

Visseren

[11] 3,886,233

[45] May 27, 1975

[54] PROCESS FOR THE PREPARATION OF GRAFT POLYMERS

[75] Inventor: Marinus J. R. Visseren, Geleen, Netherlands

[73] Assignee: Stamicarbon, N.V., Geleen, Netherlands

[22] Filed: Apr. 7, 1972

[21] Appl. No.: 242,233

[30] Foreign Application Priority Data

Apr. 10, 1971 Netherlands.................... 7104841

[52] U.S. Cl.............................................. 260/878 R
[51] Int. Cl.............................................. C08f 15/00
[58] Field of Search ............................... 260/878 R

[56] References Cited
UNITED STATES PATENTS

| | | | |
|---|---|---|---|
| 3,489,821 | 1/1970 | Witt et al. ...................... | 260/878 R |
| 3,538,190 | 11/1970 | Meredith et al. ............... | 260/878 R |
| 3,642,950 | 2/1972 | O'Shea............................ | 260/878 R |
| 3,671,608 | 6/1972 | Meredith et al. ............... | 260/878 R |
| 3,676,528 | 7/1972 | Severini et al. ................. | 260/878 R |
| 3,683,050 | 8/1972 | Meredith et al. ............... | 260/878 R |
| 3,694,522 | 9/1972 | Tsuruta et al................... | 260/878 R |
| 3,719,731 | 3/1973 | Schuster et al. ................ | 260/878 R |

FOREIGN PATENTS OR APPLICATIONS 1,023,709   3/1966   United Kingdom............ 260/80.78

OTHER PUBLICATIONS

Encyclopedia of Polymer Science and Technology, Vol. 9, pp. 817–828, Interscience, New York (1966).

*Primary Examiner*—Joseph L. Schofer
*Assistant Examiner*—A. Holler
*Attorney, Agent, or Firm*—Cushman, Darby & Cushman

[57] ABSTRACT

Impact-resistant graft copolymers prepared by grafting a styrene, acryl or mixture of styrene-type and acryl polymers or copolymers onto a multiply unsaturated polymer based on ethylene, as a terpolymer of ethylene, propylene and other multiply unsaturated monomers (EPDM-rubbers) in the presence of a radical-forming peroxydi-carbonate initiator is disclosed. Graft copolymers so produced are impact-resistant, resist aging and are useful in forming tubes, films and bottles.

19 Claims, No Drawings

PROCESS FOR THE PREPARATION OF GRAFT POLYMERS

The invention relates to a process for the preparation of graft copolymers by polymerization of a monomer or monomers of the styrene type, a monomer or monomers of the acryl type, or a mixture of one or more monomers of the styrene type and acryl monomers with less than 50 percent weight of other monomers in the presence of a largely saturated rubber-like polymer based on ethylene, one or several α-alkenes with at least three carbon atoms and a multiply unsaturated monomer, the polymerization conducted by means of a radical-forming initiator.

BACKGROUND OF THE INVENTION

Many processes have already been developed for the preparation of graft polymers in which monomers are polymerized by grafting them onto a rubber-like polymer backbone. Besides the grafted rubber polymer, resinous nongrafted polymers are obtained in this way. These two products together will be referred to as the graft polymer. Said graft polymers are employed particularly because of their high impact strength. This impact strength is due to the rubber-like phase present in the polymer. To ensure that products of good impact strength will be obtained, it is essential for at least part of the monomers polymerized to be actually grafted on the rubber-like polymer.

The rubber-like polymer used in previous industrial production processes consists of homopolymers or copolymers of butadiene, prepared with styrene, acrylonitrile or acrylates as the comonomer. By means of procedures known in the art, monomers can be grafted onto these butadiene rubbers, and the materials so obtained are characterized by a very high impact strength. However, these butadiene rubbers are unsaturated and, hence, highly susceptible to oxidation, particularly ozone from electrical motors and air pollution and irradiation by light. These atmospheric effects result in a marked deterioration of the physical and mechanical properties of the rubber product. Hence, articles in which graft copolymers based on butadiene rubbers are employed are unsuitable for outdoor use.

A number of approaches have been suggested to solve this problem including replacing the unsaturated rubbers by rubbers that are substantially saturated, such as ethylene-propylene rubbers and rubbers made of ethylene, propylene and a multiply unsaturated monomer.

It has been found, however, that grafting of monomers onto such substantially saturated rubbers according to the known processes does not yield satisfactory results. Attempts undertaken towards this end frequently result in mixtures of rubber and only poorly grafted polymers.

To improve this grafting process it has been suggested to employ very drastic and/or expensive measures, such as irradiation with gamma or beta rays, or to expose the rubbers to the action of strong shearing stresses.

It has also been suggested first to prepare a peroxide or hydroperoxide of the rubber by heating a solution of the rubber in the presence of molecular oxygen and an organic peroxide, or hydroperoxide, and subsequently re-heating the treated rubber together with monomers, which are thus partly polymerized through grafting onto the rubber. A drawback of this approach, however, is that it calls for an additional process step, which means that the procedure becomes less attractive economically.

Another suggestion regarding the polymerization of monomers through grafting onto saturated rubbers mentions the use of complicated processes, such as polymerization in several stages by means of conventional initiators, in which case solution polymerization is performed in the first stage, while, after introduction of a quantity of fresh monomers, the process is continued in the second stage by mass or suspension polymerization. Some initiators mentioned for this purpose are benzoyl peroxide, cumene hydroperoxide, tertiary butylhydroperoxide and azo-bisisobutyronitrile.

It is also known to use solution polymerization for the preparation of impact resistant products prepared on the basis of both saturated and unsaturated rubbers. However, in those cases where saturated rubbers are employed, it is essential either to use special mixtures of solvents during grafting by means of conventional initiators, or to oxidize the rubber before grafting can be started. When solvents are used, a drawback involved is that such special mixtures of solvents are required consisting of 40-60 % of aromatic hydrocarbons, with aliphatic hydrocarbons constituting the balance. Moreover, the necessary recovery and purification of the solvents for reuse is a complicated and expensive operation.

It is the object of the present invention to provide a process for the preparation of graft copolymers possessing a better aging resistance than commercial graft polymers based on butadiene homo- and copolymers. A further object is to present the possibility of making products of high impact strength in a simpler and more direct way than by the known procedures for preparing graft copolymers of the same or similar impact strength on the basis of substantially saturated rubbers. Other advantages according to the invention will be mentioned below.

DETAILED DESCRIPTION OF THE INVENTION

The process according to the invention for preparing graft copolymers by polymerization of one or several monomers of the styrene type and/or one or several acryl monomers, or a mixture of one or several monomers of the styrene type and/or one or several acryl monomers with less than 50 percent weight of other monomers, in the presence of a largely saturated rubber-like polymer based on ethylene, one or several α-alkenes with at least three carbon atoms and a multiply unsaturated monomer bymeans of a radical-forming initiator, is characterized in that for the rubber-like largely saturated polymer there is used a polymer containing 19 – 73 percent weight of ethylene, 23 – 77 percent weight of one or more alkenes, the alkenes having at least three carbon atoms and 4 – 20 percent weight of one or more multiply unsaturated monomers and that the radical-forming initiator is a peroxydicarbonate compound.

By peroxydicarbonate compound as used herein is meant a compound containing at least one group having the following structural formula:

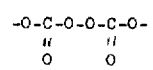

The use of these initiators makes it possible to graft the above-mentioned unsaturated monomers on substantially saturated rubber-like ethylene terpolymer backbones and thus to produce graft polymers whose impact strength is at least equal to or superior to that of graft polymers prepared by means of more complicated processes with the aid of the customary initiators. According to the invention, mixtures of peroxydicarbonate compounds, or mixtures of one or several peroxydicarbonate compounds with one or several other radical-forming initiators, can also be employed.

Preferably peroxydicarbonate compounds having the general formula:

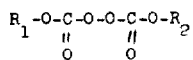

$$R_1-O-C-O-O-C-O-R_2$$
$$\quad\;\; \| \quad\quad\;\; \|$$
$$\quad\;\; O \quad\quad\;\; O$$

where $R_1$ and $R_2$ may represent hydrocarbon radicals with 1–30 carbon atoms. By hydrocarbon is meant alkyl-, cycloalkyl-, aryl-, aralkyl-, alkaryl-, alkenyl- or mainly ring-substituted cycloalkyl groups, either substrated or not. $R_1$ and $R_2$ need not represent identical groups.

Illustrative but non-limiting examples of the peroxydicarbonate compounds are: diisopropylperoxydicarbonate, dibutylperoxydicarbonate, dicyclohexylperoxydicarbonate, bis(4-tertiarybutylcyclohexyl)peroxydicarbonate, bis(4-tertiary amylcyclohexyl)peroxydicarbonate, bis(4-cyclohexylcyclohexyl)peroxydicarbonate and bis(4-cyclohexylisopropylcyclohexyl)peroxydicarbonate, di-secondary amylperoxydicarbonate, didecylperoxydicarbonate, dilaurylperoxydicarbonate, dibenzylperoxydicarbonate, bis(2-ethylhexyl)peroxydicarbonate, distearylperoxydicarbonate, bis(2-methoxyethyl)peroxydicarbonate and bis(2-ethoxyethyl)peroxydicarbonate. Other initiators will be apparent from the above formula. In certain cases para-substituted cyclohexyl derivatives are to be preferred because of their stability during storage, and the consequent, relatively low explosion hazard.

The amount of peroxydicarbonate compound used is preferably 0.01–2 mole percent calculated on the amount of monomers.

Rubbers used according to the process of the invention are described generally in United States patents and are characterized as copolymers of ethylene and one or several α-alkenes with at least 3 carbon atoms in which multiply unsaturated monomers have also been copolymerized. Examples of α-alkenes with at least 3 carbon atoms are propylene and butene. The upper limit of carbon atoms is not critical but is preferably chosen at about 6. Examples of multiply unsaturated monomers are linear not conjugated dienes, e.g., hexadiene, 2-methylpentadiene-1-4; monocyclic diolefins, e.g., cycloheptadiene-1,4, cyclooctadiene; bicyclic diolefins, e.g., 4,7,8,9-tetrahydroindene, isopropylidenetetrahydroindene, bicylo(3,2,0)heptadiene-2,6; polyalkenylcycloalkanes, e.g., divinylcyclobutane, 1,2,4-trivinylcyclohexane; norbornene derivatives, e.g., dicyclopentadiene, 5-methylenenorbornene-2, 5-buten-2 ylnorbornene-2, 5-ethylidenenorbornene-2, 5-vinylnorbornene-2, tricyclopentadiene, 5(2-propenyl)-norbornene-2, 5-(5-hexenyl)-norbornene-2 and linear trienes, e.g., decatriene.

Preferably use is made of terpolymers based on ethylene, propylene and one or several multiply unsaturated monomers (the so-called EPDM-rubbers) or copolymers of ethylene, a mixture of propene and butene and one or several multiply unsaturated monomers. These so-called EPDM-rubbers have an ethylene content of 19–73 percent weight, preferably of 30–68 percent weight, a propylene content of 23–77 percent weight, preferably of 26–56 percent weight, and a content of multiply unsaturated compounds of 4–20 percent weight, preferably of 6–15 percent weight. Mixtures of these rubbers with, e.g., unsaturated rubbers can also be employed. EPDM-rubbers are discussed in U.S. Pat. Nos. 2,933,480, 3,211,709, 3,093,620 and British Pat. Nos. 914,884, 1,014,873 the disclosure of which is hereby incorporated by reference.

Monomers of the styrene type that are used according to the invention are styrene or styrene derivatives that are substituted either in the vinyl group or in the aromatic nucleus or both, and may be selected, for example, from the following group: styrene, α-methylstyrene, mono- and dichlorostyrene, ethylstyrene, vinyltoluene and vinylxylene. The acrylmonomers are selected from the monomers comprising acrylonitrile, methacrylonitrile and other known substitution products of acrylonitrile, or from acrylic acid and esters of acrylic acid, either of which may be substituted or unsubstituted. Examples are methylmethacrylate, ethylacrylate, ethylmethacrylate, propylacrylate, propylmethacrylate, butylacrylate, butylmethacrylate, 2-ethylhexylacrylate and methylacrylate.

According to the present invention, one or several monomers of the styrene type and/or one or several acryl monomers may be polymerized in the presence of an attached to a largely saturated rubber-like ethylene polymer backbone. For example, the polymerization can be carried out either with styrene or α-methylstyrene alone, or with acrylonitrilestyrene mixtures, as well as with styrene-α-methylstyrene mixtures and styrene-α-methylstyrene-acrylonitrile mixtures. It is possible, for example, to polymerize methacrylonitrilestyrene mixtures, and also acrylonitrile-methylmethacrylate mixtures, acrylonitrile-ethylacrylate mixtures, or methacrylonitrile-methylacrylate mixtures. Mixtures of one or several monomers of the styrene type and/or one or several acryl-monomers with less than 50 percent weight of other ethylenically unsaturated monomers may also be employed. Examples of such monomers are: olefines such as ethylene, propylene, butylene, vinylethers, vinylesters and other vinyl compounds, acrylamides, unsaturated dicarboxylic acids and esters thereof. When used, these ethenically unsaturated monomers are present to the extent of at least 0.1 percent.

During the polymerization the weight ratio between the rubber-like polymer and the graft monomers may vary between 4:1 and 1:40. A ratio of between 2:1 and 1:20 is preferred. The resulting products have a rubber backbone molecular weight ($\overline{M}_w$) of from about 1.000 to about 20.000.000 and represent from about 2½ percent to about 80 percent of the total weight of the graft copolymer so produced. The grafted side chains, either polymers or copolymers represent from about 20 percent to about 97½ percent of the total weight of the graft copolymer.

The process according to the invention can be carried out in various ways generally known in the art including: suspension-, mass- or solution polymerization techniques. Combinations of these techniques are also suitable.

If use is made of mass polymerization, the rubber component is mixed with, and, if so desired, dissolved in the monomers in the presence of peroxydicarbonate compounds. It is frequently advantageous to terminate the mass polymerization prematurely before 50 percent of the desired graft copolymer has been produced by suspending the whole body of graft polymer formed together with resinous polymer and monomers in a diluent, and then continuing the polymerization. This is advantageous because a procedure entirely based on the mass polymerization principle is often difficult to control. Also, the heat can be discharged more easily. Suitable diluents are liquids that do not take part in the polymerization reaction and are known in the art. They include water and organic liquids, such as pentane, 3-methylpentane, 2-methylpentane, hexane, n-heptane, methylhexane, n-octane, methyloctane, cyclohexane, methylcyclopentane, methylcyclohexane, benzene, chlorobenzene, toluene, dimethylbenzene, xylene, ethylbenzene, naphthalene, methylenechloride, tetrachloroethylene, 1,2-dichloroethane, ethylchloride, ethylenedichloride, carbon tetrachloride and trichloroethylene. Most of these diluents are also suitable for use in solution polymerisation.

The choice of the polymerization technique will frequently depend on several factors. For example, the form in which the rubber-like polymer is available (solid, solution) will play an important part in the choice of the polymerization technique to be used.

Preference is given to solution or mass polymerization, although solution polymerization is most preferred.

The temperatures to be employed in these polymerizations depend on the particular type of polymerization to be used. Temperatures normally lie between 30° and 125°C. In the case of mass polymerization it may be desirable in a subsequent polymerization step to use a temperature of at most 225°C.

Conveniently the reactions are conducted at atmospheric pressure, although lower and higher pressures may be used, e.g., up to 100 atm. The reactions are preferably conducted in the presence of an inert gas such as nitrogen, although other inert gases may be used.

If desired, blowing agents, preferably in liquid form, may be present during the polymerization; in such cases the ultimate graft copolymer can be processed to a foam or to a product consisting of a foamed graft copolymer. Based on my studies, it has appeared that products with a good impact strength are obtained only if the terpolymer used contains more than 4 percent weight of incorporated multiply unsaturated monomers. The highest values are obtained if the percentage incorporation is higher than 6 percent. Incorporation of more than 20 percent weight is not necessary as a rule, 15 percent is amply sufficient in most cases.

The graft copolymers obtained by the process according to the invention are particularly suited for applications in which high demands are made on the mechanical and physical properties of the product, such as impact strength, aging-resistance, stiffness and the like.

The graft copolymers can also be mixed with other polymers or copolymers in order to prepare polymer mixtures or blends of high impact strength. Suitable polymers include polyvinyl chloride, re-chlorinated polyvinyl chloride, polypropylene, poly-4-methylpentene-1, polybutylene, polystyrene, copolymers of predominantly styrene and other monomers, copolymers of predominantly acrylonitrile, with other monomers like acrylates, methacrylates, olefines and polycarbonate among others.

The graft copolymers may also be mixed with the homopolymer or copolymer of the same, or substantially the same, composition as the polymer that would have been obtained if the polymerization had been carried out in the absence of the rubber-like backbone polymers.

The graft copolymers or mixtures of said graft copolymers with other polymers may be mixed in the customary way with the known auxiliaries like antioxidants, antistatics, lubricants, fillers, dyes, pigments, UV-stabilizers, fungicides and the like as is known in the art.

The graft copolymers or mixtures of graft copolymers with other polymers, are suited for many applications. They can be used for production of impact resistant articles such as pads and bumpers, packaging material, such as tubes, bottles, films, furniture, automobile dashboards, cabinets and casings for electronic and domestic equipment or even shoe heels.

The following non-limiting examples are further illustrative of the present invention. Unless otherwise indicated, all parts and percentages are by weight.

EXAMPLES 1–26 AND COMPARATIVE EXAMPLES A-P

In each of the following examples, EPDM solution (500 ml) was measured under nitrogen into a three-necked 1-liter flask fitted with a stirrer, a reflux cooler and a thermometer. The solution contained approximately 50 g of polymer per liter of heptane solvent. Next the monomers and initiator were added, with simultaneous stirring, whereupon the temperature was raised to the value required for starting the polymerization. During the polymerization the temperature was kept at a constant value. Depending on the type of initiator, this value varied between 50° and 80°C.

The polymerization was terminated by pouring the viscous polymer-solvent mixture into methanol, which caused the graft copolymer to precipitate. After being washed and dried, the graft copolymer was mixed with a separately prepared copolymer in the amount needed to bring the rubber content to about 20 percent by weight of the product (unless stated otherwise). This copolymer had the same composition as the resinous part of the graft copolymer. The results of these experiments are summarized in the following tables.

Comparative examples (lettered examples A through N) are not according to the present invention. They were conducted under the same conditions as were examples 1–26 but using initiators other than of the peroxydicarbonate type.

The following terms and abbreviations are used in Tables 1 to 5:

| Initiator | |
|---|---|
| BP | benzoylperoxide |
| AIBN | azobisisobutyronitrile |
| CHP | cumene hydroperoxide |
| TBPB | tertiary butylperbenzoate |

-Continued

Initiator

| | |
|---|---|
| LP | lauroyl peroxide |
| DPB | dibenzoyl peroxide |
| DLP | dilauroylperoxyde |
| CHPC | cyclohexyl peroxydicarbonate |
| TBCHPC | tertiary butyl cyclohexyl peroxydicarbonate |

Monomers

| | |
|---|---|
| S | styrene |
| An | acrylonitrile |
| MA | methylacrylate |
| Man | methacrylonitrile |

Rubber

| | |
|---|---|
| DCPD | dicyclopentadiene |
| EN | 5-ethylidene norbornene-2 |
| Type A | ethylene-propylene-DCPD-terpolymer with 3.0 – 6.0 % weight of DCPD |
| Type B | ethylene-propylene-DCPD-EN-quaterpolymer with 1.0 – 2.0 % weight of DCPD and 7.0 – 9.0 % weight of EN. |

— The rubbers used contained 38–48 percent weight of propylene and had a Mooney value (ML 1+4 at 125°C) varying between 40 and 80.
— The notched impact strength (measured according to ASTM D 256) is expressed in kgcm/cm$^2$ and the E modulus in kg/cm$^2$. These characteristics were both measured at 20°C.
— The amount of initiator is expressed in mole percent calculated on the amount of monomers.

TABLE 1

Grafting Mixtures of Styrene and Acrylonitrile
Monomers Onto a Type A Rubber Using Selected Initiators

| Example | Initiator (mole %) | Monomers S/An(g) | Notched Impact Strength | E Modulus |
|---|---|---|---|---|
| A | BP 0.2 | 70/30 | 2.8 | 14.200 |
| B | BP 0.2 | 70/30 | 2.5 | 13.500 |
| C | BP 0.5 | 70/30 | 1.8 | 17.200 |
| D | TBPB 0.2 | 70/30 | 2.0 | 19.100 |
| E | TBPB 0.2 | 35/15 | 1.8 | 18.000 |
| F | TBPB 0.4 | 35/15 | 2.0 | 17.500 |
| G | TBPB/BP 0.2 | 70/30 | 2.2 | 13.500 |
| H | BP/CHP 0.2 | 70/30 | 3.1 | 13.350 |
| 1 | TBCHPC 0.2 | 35/15 | 9.2 | 17.500 |
| 2 | TBCHPC 0.2 | 35/15 | 7.0 | 18.400 |
| 3 | TBCHPC 0.5 | 37½/12½ | 6.8 | 17.150 |
| 4 | TBCHPC 0.5 | 37½/12½ | 7.0 | 18.900 |
| 5 | TBCHPC 0.5 | 37½/12½ | 6.5 | 18.000 |

TABLE 2

Grafting Mixtures of Styrene and Acrylonitrile
Monomers onto a Type B Rubber Using Selected Initiators

| Example | Initiator (mole %) | Monomers S/An(g) | Notched Impact Strength | E Modulus |
|---|---|---|---|---|
| I | DPB 0.5 | 37½/12½ | 9.8 | 16.100 |
| J | AIBN 0.5 | 37½/12½ | 1.7 | 19.250 |
| K | LP 0.5 | 37½/12½ | 1.6 | 19.500 |
| L | TBPB/BP 0.2 | 70/30 | 2.8 | 11.600 |
| 6 | CHPC 0.2 | 37½/12½ | 69 | 16.000 |
| 7 | CHPC 0.2 | 37½/12½ | 73 | 16.000 |
| 8 | CHPC 0.5 | 37½/12½ | 60 | 15.600 |
| 9 | CHPC 0.5 | 37½/12½ | 52 | 16.500 |
| 10 | TBCHPC 0.2 | 37½/12½ | 62 | 17.400 |
| 11 | TBCHPC 0.5 | 37½/12½ | 75 | 16.000 |
| 12 | TBCHPC 0.5 | 37½/12½ | 81 | 16.500 |
| 13 | TBCHPC 0.2 | 75/25 | 32 | 15.400 |
| 14 | TBCHPC 0.2 | 56/19 | 48 | 13.900 |
| 15 | TBCHPC 0.2 | 35/15 | 54 | 15.400 |
| 16 | TBCHPC 0.2 | 25/8 | 44 | 19.000 |
| 17 | TBCHPC/BP 0.4 | 37½/12½ | 45 | 14.600 |
| 18 | TBCHPC/LP 0.4 | 36½/12½ | 70 | 16.100 |

TABLE 3

Grafting Styrene and Acrylonitrile Monomers
(37.5 and 12.5 g Respectively)
Onto a Type B Rubber in the Presence of 0.5 Mole % TBCHPC

| Example | Rubber % | Notched Impact Strength | E Modulus |
|---|---|---|---|
| 19 | 20 | 67 | 14.800 |
| 20 | 15 | 56 | 18.300 |
| 21 | 10 | 19 | 21.700 |

TABLE 4

Grafting Mixtures of Acrylonitrile and Methylacrylate
Monomers Onto a Type B Rubber

| Ex. | Initiator (Mole %) | Monomers An/MA (g) | Notched Impact Strength | E Modulus | Rubber Content |
|---|---|---|---|---|---|
| 22 | TBCHPC 0.1 | 60/40 | 5.1 | 35.300 | 10.9 |
| 23 | TBCHPC 0.2 | 60/40 | 20.8 | 23.100 | 22.2 |
| 24 | TBCHPC 0.1 | 60/40 | 2.8 | 43.500 | 5.7 |
| 25 | TBCHPC 0.1 | 70/30 | 6.2 | 35.100 | 11.1 |
| M | DLP 0.1 | 70/30 | 2.5 | — | 11.1 |

TABLE 5

Grafting Mixtures of Styrene and Methacrylonitrile
Monomers Onto a Type B Rubber

| Ex. | Initiator (Mole %) | Monomers S/Man (g) | Notched Impact Strength | E Modulus | Rubber Content |
|---|---|---|---|---|---|
| 26 | TBCHPC 0.5 | 20/80 | 5.4 | 23.300 | 11.5 |
| N | DLP 0.5 | 20/80 | 1.8 | — | 14.2 |

EXAMPLE 27

The process as described in examples 1–26 was repeated, differing however, in that diisopropylperoxydicarbonate was employed as the initiator.

A mixture of styrene (37.5 g) and acrylonitrile (12.5 g) was polymerized with 0.2 mole percent of diisopropylperoxydicarbonate in the presence of a B-type rubber (25 g). The polymerization was carried out in heptane as the solvent. The rubber content of the resulting graft copolymer was adjusted to 20 percent weight in the manner described in the examples 1–26.

The results were as follows: Notched Impact Strength - 46 kgcm/cm$^2$; E-Modulus - 18.300 kg/cm$^2$; and Melt Index - 0.32 g/10 min.

COMPARATIVE EXAMPLE O

Example 27 was repeated, with the difference, however, that the rubber used was a butyl rubber with approximately 1 mole percent of incorporated isoprene, while TBCHPC was employed as the initiator. The results were as follows: Notched Impact Strength - 2.6 kgck/cm², E-Modulus - 19.400 kg/cm²; Melt Index 1.6 g/10 min.

COMPARATIVE EXAMPLE P

Example O was repeated, with the difference however, that 0.5 mole percent of TBCHPC was employed while the rubber used was an ethylene-propylene-copolymer containing no unsaturation. The results were as follows: Notched Impact Strength - 1.7 kgcm/cm²; E-Modulus - 20.400 kg/cm² and Melt Index 1.75 g/10 min.

What is claimed is:

1. Process for preparing graft copolymers by polymerizing, in the presence of a radical-forming initiator, at least one monomer selected from the class consisting of:
   A. styrene, α-methyl-styrene, monochlorostyrene, dichlorostyrene, ethyl styrene, vinyltoluene, vinylxylene, and mixtures thereof;
   B. acrylonitrile, methacrylonitrile, methylacrylate, methylmethacrylate, ethylacrylate, ethylmethacrylate, propylacrylate, propylmethacrylate, butylacrylate, butylmethacrylate, 2-ethylhexylacrylate, and mixtures thereof; and
   C. mixtures of A and B;
in the presence of a rubber-like largely saturated polymer containing:
   i. ethylene, from about 19 to about 73 weight percent;
   ii. at least one alkene, having from 3 to 6 carbon atoms, about 23 to about 77 weight percent; and
   iii. at least one multiply unsaturated monomer, from about 4 to about 20 weight percent;
said polymerization conducted at a temperature of about 30 to about 230°C and in the presence of a peroxydicarbonate radical-forming initiator of the formula:

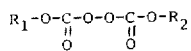

wherein $R_1$ and $R_2$ are independently hydrocarbon groups having from 1 to 30 carbon atoms either substituted or not.

2. Process as claimed in claim 1, wherein $R_1$ and $R_2$, being the same or different, are alkyl, cycloalkyl, aryl, aralkyl, alkaryl and alkenyl groups all having from 1 to 30 carbon atoms, either substituted or not.

3. Process according to claim 2, wherein $R_1$ and $R_2$ are cycloalkyl groups of from 3 to 6 carbon atoms.

4. Process as claimed in claim 1, wherein said peroxydicarbonate compound is selected from the class consisting of diisopropylperoxydicarbonate, dibutylperoxy-dicarbonate, dicyclohexylperoxydicarbonate, bis(4-tertiary butylcyclohexyl)peroxydicarbonate, bis-(4-tertiaryamylcyclohexyl)peroxydicarbonate, bis(4-cyclohexylcyclohexyl) peroxydicarbonate and bis(4-cyclohexylisopropylcyclohexyl) peroxydicarbonate, di-secondary amylperoxydicarbonate, didecylperoxydicarbonate, dilaurylperoxydicarbonate, dibenzylperoxydicarbonate, bis(2-ethylhexyl)peroxydicarbonate and distearylperoxydicarbonate.

5. Process as claimed in claim 1, wherein the amount of said peroxydicarbonate is between about 0.01 and about 2 mole percent calculated on the amount of monomers.

6. Process according to claim 1, wherein the rubber-like largely saturated polymer is a copolymer of ethylene and at least one α-alkene having from 3 to 6 carbon atoms copolymerized with at least one multiply unsaturated monomer selected from the group consisting of hexadiene-1,4, dicyclopentadiene, tricyclopentadiene, 5-vinylnorbornene-2, 5-ethylidenenorbornene-2, 5-methylenenorbornene-2, 5-(2-propenyl)norbornene-2, 5-(5-hexenyl)norbornene-2, 4,7,8,9 tetrahydroindene and isopropylidene tetrahydroindene, the content of said rubber being of from 19 to 73 percent weight ethylene, 23 – 77 percent weight α-alkene and from 4 to 20 percent weight multiply unsaturated monomer.

7. Process according to claim 6, wherein ethylene is present from 38 to 68 percent weight, propylene is the α-alkene and is present from 26 to 56 percent weight and from 6 to 15 percent weight of the multiply unsaturated monomer is present.

8. Process according to claim 1, wherein said rubber is ethylene-propylene-dicyclopentadiene terpolymer containing from 3.0 to 6.0 percent weight of dicyclopentadiene.

9. Process according to claim 1, wherein said rubber is ethylene-propylene-dicyclopentadiene-5-ethylidene-norbornene-2 quaterpolymer containing from 1.0 to 2.0 percent weight dicyclopentadiene and from 7.0 to 9.0 percent weight 5-ethylidene norbornene-2.

10. Process according to claim 1, wherein there is also present, to the extent of less than 50 weight percent of the monomers of parts A, B or C to be polymerized, an ethylenically unsaturated monomer other than stated in paragraphs A, B or C and selected from the group consisting of ethylene, propylene, butylene, vinyl ethers, vinyl esters, acrylamides, unsaturated dicarboxylic acids and esters of unsaturated dicarboxylic acids.

11. Process according to claim 1, wherein the ratio of rubber-like polymer and the graft monomers of parts A, B or C is between 4:1 and 1:40.

12. Process according to claim 11, wherein the ratio is between 2:1 and 1:20.

13. Process according to claim 1, wherein the rubber-like polymer amounts to from 2.5 to 80 percent weight of the resulting graft copolymer.

14. Process according to claim 1, wherein the polymerization is conducted by mixing the rubber with the monomer of part A, B or C in the presence of the peroxydicarbonate compound and, when not greater than 50 percent of the desired graft copolymer has been produced, the polymerization is terminated, and continued in a diluent until completion.

15. Process according to claim 1, wherein the monomer of part A is styrene.

16. Process according to claim 1, wherein the monomer of part B is selected from the class consisting of acrylonitrile, methylacrylate, methacrylonitrile, methylmethacrylate, ethylacrylate and butylacrylate.

17. Process according to claim 1, wherein the peroxydicarbonate initiator is cyclohexyl peroxydicarbonate, tertiary butyl cyclohexyl peroxydicarbonate and mixtures thereof.

18. Graft copolymer prepared by the process of claim 1.

19. A molded object comprising the graft copolymer of claim 18.

* * * * *